Patented May 15, 1951

2,553,050

UNITED STATES PATENT OFFICE 2,553,050

CONDENSATION PRODUCTS OF THE NAPHTHOQUINONE-IMINE SERIES

Valentin Kartaschoff and Ernest Merian, Basel, Switzerland, assignors to Sandoz, A. G., Basel, Switzerland, a Swiss firm No Drawing. Application February 13, 1950, Serial No. 144,042. In Switzerland February 24, 1949

14 Claims. (Cl. 260—163)

This invention relates to the preparation of new and valuable compounds of the naphthoquinone-imine series.

It is known that if dinitronaphthalene is reduced in sulfuric acid a compound generally referred to as "naphthazarine intermediate" having the formula

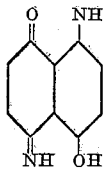

or—according to the modern writing—

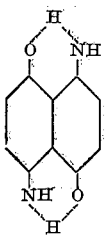

is produced, and that this compound can be condensed with amines and further sulfonated to yield dyestuffs.

It has been found that while the condensation products obtained by condensing the naphthazarine intermediate with amines, as more fully described in U. S. Patent No. 647,370 and having the general formula

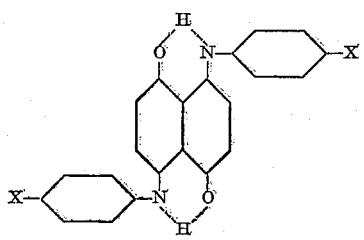

—X being —H, —CH₃ or —NH₂, are suitable for coloring oils, fats and waxes including petroleum oil fractions such as gasoline, in beautiful green shades, and if sulfonated are useful as acid wool dyestuffs, they have practically no affinity for cellulose acetate and superpolyamides.

It has further been ascertained that while the condensation products obtained by condensing naphthazarine intermediate with only one amine, as more fully described in U. S. Patents Nos. 2,066,119 and 2,135,366 and having the general formula

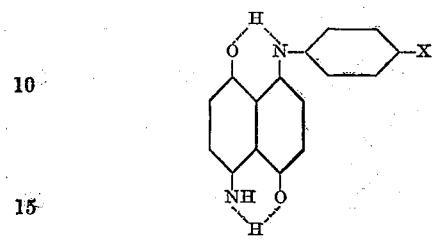

—X being —H, —OH, —NH₂, —O-alkyl or —O-alkyl-OH, are suitable for dyeing cellulose acetate and superpolyamides, the results are only blue to greenish-blue shades.

In our copending application, Ser. No. 144,041, filed on even date herewith, there are described and claimed the condensation products obtained by condensing naphthazarine intermediate with an equivalent of aromatic aminoazo compound. They are suitable for dyeing cellulose acetate and superpolyamides in beautiful green, yellowish-green, olive and brown shades.

It has further been ascertained that the naphthazarine intermediate can be halogenated. The reaction products are described and claimed in copending application, Ser. No. 120,597 (continuation of application Serial No. 729,401, filed February 18, 1947) and correspond to the general formula

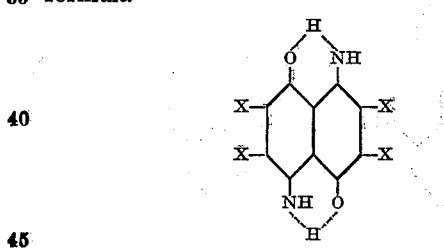

wherein at least one X stands for a halogen atom, the other X's being hydrogen. According to copending application Ser. No. 34,553, filed June 22, 1948, now Patent No. 2,538,005, issued January 16, 1941, one of the nitrogen atoms of these compounds may be hydrolyzed to produce compounds corresponding to the formula

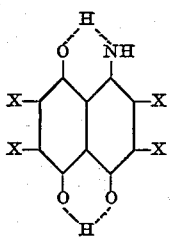

wherein at least one X stands for a halogen atom, the other X's being hydrogen.

It is an object of this invention to produce a new class of condensation products by condensing one mole of an aromatic aminoazo compound, free from sulfonic acid groups, with one mole of a halogenated naphthoquinone-imine. The new condensation products are suitable for dyeing cellulose acetate and superpolyamides in beautiful green, olive, brown, grey and blue shades. As halogenated naphthoquinone-imines there are employed those more particularly described in the aforesaid applications, Ser. No. 729,401 and Ser. No. 34,553, that is to say the following compounds:

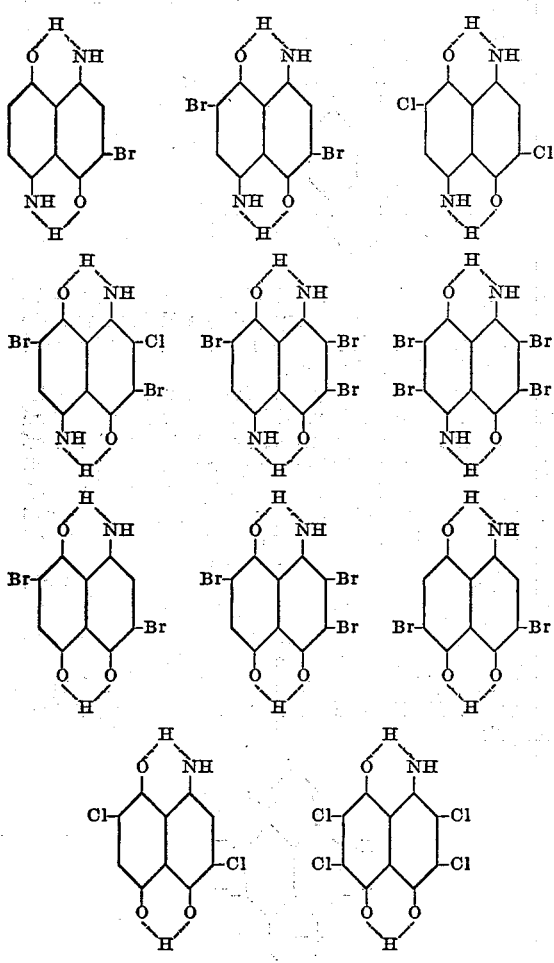

and similar ones.

In copending application, Ser. No. 743,195, there is described and claimed the condensation of the halogenated naphthazarine intermediate (Ser. No. 729,401) with aromatic amines, such as aniline, p-toluidine, o-anisidine, aminohydroquinone dimethyl ether, benzidine, tetrahydro-β-naphthylamine, p-aminoacetanilide, cresidine, the resulting condensation products being blue, reddish blue and navy blue dyes for cellulose acetate and nylon.

However, the analogous condensation products (with aromatic amines) of halogenated and hydrolyzed naphthazarine intermediates according to application, Ser. No. 34,553, are worthless because of their lack of fastness to light.

It could therefore not be expected that also aminoazo compounds can easily be condensed with these halogenated intermediates to get valuable dyestuffs of various shades besides blue, reddish blue and navy blue, which are considerably fast to light, to washing and to gas-fumes. It is furthermore very surprising that these new condensation products have such a great affinity for cellulose acetate and superpolyamides though they are halogenated and though they have such a high molecular weight.

It is a further object of this invention to dye cellulose ester fibers, synthetic polyamide fibers and polyurethane fibers in green, olive, brown and grey shades. Up to now these shades were produced either by using dyestuff mixtures of the dispersed type, i. e. mixtures of yellow and blue dyestuffs, or by dyeing cellulose acetate and superpolyamides with aromatic aminoazo compounds followed by diazotizing and developing with suitable coupling compounds, this process being very complicated. Dyestuff mixtures of the dispersed type, moreover, have the disadvantage that, depending upon the method of dyeing, different shades are obtained being sometimes more yellow, sometimes more blue. Furthermore, these mixtures are either fast to light or fast to gas-fumes, according to the blue component employed.

These green, olive, brown and grey shades, obtainable with uniform dyestuffs of the dispersed type, are of good fastnesses to light and to gas-fumes and can be discharged in light shades giving a pure white.

As aminoazo compounds suitable for condensation with the halogenated naphthazarine intermediates mentioned above, the most varied substituted derivatives of the general formula

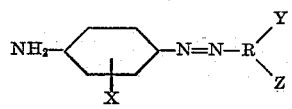

wherein X, Y and Z stand for hydrogen or a substituent other than the sulfonic acid group and wherein R is a carbocyclic or a heterocyclic radical, can be used, as for example, 4-aminoazobenzene, 4-aminoazotoluene, 4'-amino-4-nitro-azobenzene, 4'-amino-4-carboxyazobenzene, 4'-amino-4-dimethylaminoazobenzene, 4'-amino-4-ethylhydroxyethylaminoazobenzene, 4'-amino-4-hydroxyethylaminoazobenzene, 4'-amino-4-ethylglycerylaminoazobenzene, 4-aminobenzeneazonaphthalene, 4-amino-2-hydroxy-azobenzene, 4'-ethoxy-4-amino-4-hydroxy-azobenzene, aniline-(4'-azo-4)-(3-methylpyrazolone-(5)), 4-amino-2'-hydroxy-5'-methylazobenzene, in so far as these compounds have not been previously described, they can be obtained by coupling diazotized nitroanilines with the desired coupling components and subsequent reduction of the nitro group with e. g. sodium sulphide or sodium sulfhydrate or by coupling diazotized aminoacetanilides or any other aminoacylanilides followed by a hydrolysis of the acylamino group.

The condensation with the naphthoquinone-imine is advantageously carried out in the presence of a solvent which is indifferent to the reaction compounds, such as e. g. acetic acid, propionic acid, ethanol, isopropanol, and dilute acetic acid, at an elevated temperature and may also advantageously be carried out in presence of a condensation accelerator such as boric acid, copper, copper salts, sodium acetate and the like.

The new condensation products thus obtained correspond to the general formula

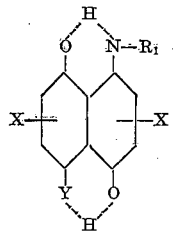

wherein

X is halogen or —NH—$R_1$,
Y is —O— or —NH—, $R_1$ is hydrogen or

R₂ being a carbocyclic or a heterocyclic radical and
$Z_1$, $Z_2$, $Z_3$ being hydrogen or substituents other than sulfonic acid groups.

These new compounds dissolve in organic solvents with green, olive, grey or brown colors. They can be used either as dyestuffs for cellulose ester fibers, synthetic polyamide and polyurethane fibers or as intermediates for the preparation of other dyestuffs.

The following examples illustrate how the invention may be carried out in practice, but they are in no way limitative. Parts are by weight and temperatures in degrees centigrade.

EXAMPLE 1

200 parts of finely powdered 3.7-dibromo-5-amino-8-hydroxy-1.4-naphthoquinone-1-imine are stirred in 450 parts of glacial acetic acid and treated at 60° with 120 parts of 4-aminoazobenzene. After 6 hours it will be found that a sample, when placed on filter paper, gives a blackish green residue and a green solution. The product is poured onto 1500 parts of ice-water and filtered. After washing out a small excess of 4-aminoazobenzene and drying, a powder is obtained which dyes acetate silk and nylon in pure green shades. The new dyestuff corresponds to the formula If 80 parts of crystalline sodium acetate are added to the reaction mass, the condensation takes place more rapidly. In this case, the obtained dyestuff dyes acetate silk and nylon in somewhat bluer shades. It corresponds to a mixture of and Similar products are obtained by using ethanol, isopropanol, dilute acetic acid or propionic acid in lieu of the glacial acetic acid.

EXAMPLE 2

200 parts of the halogenated naphthoquinone-imine used in Example 1 are stirred in 400 parts of glacial acetic acid, 80 parts of sodium acetate added and treated at 80–90° with 120 parts of 4-aminoazotoluene. After a short time the reaction is ended and the mass is poured into 1500 parts of ice-water and filtered. The obtained product dyes acetate silk and nylon somewhat more yellow than that of the first example. The new dyestuff corresponds to the formula

EXAMPLE 3

87 parts of the halogenated naphthoquinone-imine used in the first example, 300 parts of glacial acetic acid and 72 parts of 4-amino-4'-nitro-azobenzene are stirred for 1 hour at 90°. Then the product is worked up in the same way as that of the preceding examples. The new compound which corresponds mainly to the formula colors cellulose acetate in yellowish olive and nylon in brown shades.

EXAMPLE 4

35 parts of the halogenated naphthoquinone-imine used in the first example are warmed in 300 parts of glacial acetic acid up to 80–90°, when 23 parts of 4-amino-2'-hydroxy-5'-methyl-azo-benzene are introduced. The temperature is kept at 80–90° for another 2 hours and then the product isolated as fully described above. The new condensation product dyes cellulose acetate and nylon in pure green shades. It is distinguished especially by its great dyeing power. The principal product of the dyestuff has the formula

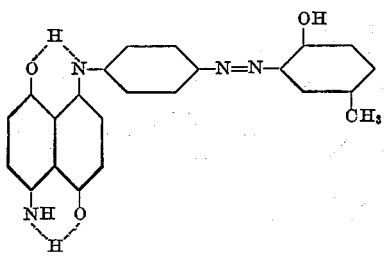

EXAMPLE 5

35 parts of the halogenated naphthoquinone-imine of Example 1 are warmed in 300 parts of glacial acetic acid up to 80–90°, when 29 parts of 4-amino-4'-ethylhydroxyethylamino-azobenzene are introduced. Then the temperature is slowly raised to 100–105°. After 2 hours the reaction mass is poured onto ice-water and isolated in the usual way. A dark powder is obtained, which dyes cellulose acetate in brown and nylon in brownish purple shades. It consists mainly of

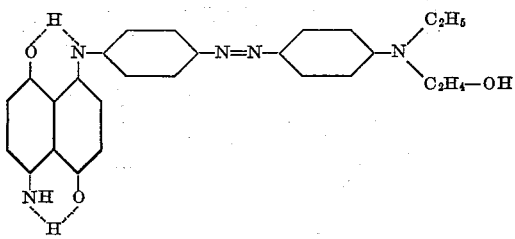

EXAMPLE 6

35 parts of 3.7-dibromo-5.8-dihydroxy-1.4-naphthoquinone-1-imine are stirred up in 300 parts by glacial acetic acid at 80–90°, when 22 parts of 4-aminoazobenzene are introduced. The temperature is raised up to 105° and condensation continued for 2 hours. Then the reaction mass is poured onto ice-water, filtered, washed free from acid and from a small excess of 4-aminoazobenzene. The new dyestuff colors cellulose acetate in grey and nylon in grey-brown shades. It consists of a mixture of

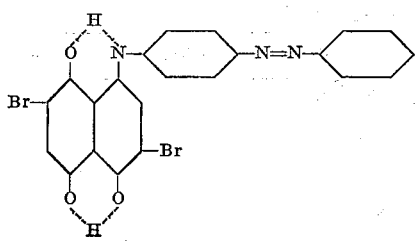

and

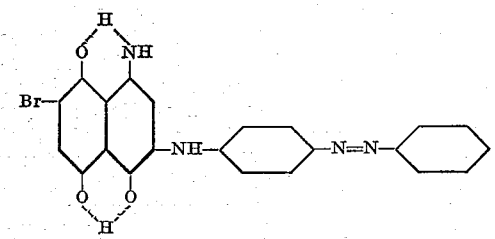

EXAMPLE 7

When 29 parts of 4-amino-4'-nitro-azobenzene are taken in place of the 4-aminoazobenzene in the preceding example, there is obtained mainly the dyestuff of the formula

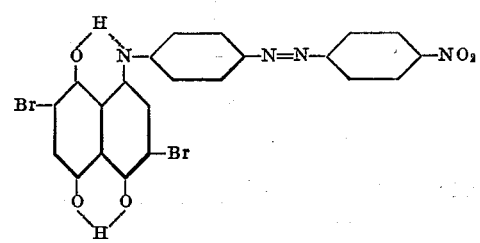

The new compound dyes acetate silk in sepia and nylon in reddish-brown shades.

EXAMPLE 8

When the 4-aminoazobenzene in Example 6 is replaced by 29 parts of 4-amino-4'-ethylhydroxyethyl-amino-azobenzene, the principal reaction product has the following formula:

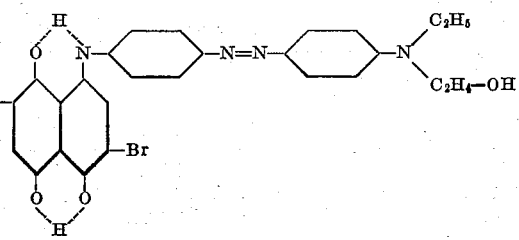

The new dyestuff colors cellulose acetate in red-brown and nylon in Bordeaux shades.

EXAMPLE 9

35 parts of 3.7-dibromo-5-amino-8-hydroxy-1.4-naphthoquinone-1-imine are stirred in 300 parts by glacial acetic acid and treated at 75° with 25.7 parts of 4'-ethoxy-4-amino-2-hydroxy-azobenzene. After 3 hours it will be found that a sample is soluble in ethanol with a yellowish green coloration. The product is poured onto 1500 parts of ice-water and filtered. After washing and drying, a powder is obtained which dyes acetate silk and nylon in green shades.

When the reaction is carried out in glacial acids, condensation generally takes place with the imino group in the α-position, while it takes place also with the halogen atom in the β-position when the reaction medium is diluted with water, alcohol or even more when a rather alkaline catalyst such as sodium acetate is used.

The following tables summarize the properties of additional series of condensation products, made by proceeding according to the foregoing examples. Additional condensation products within the purview of the invention can be prepared by using the other halogenated naphthoquinone-imines enumerated on column 3 of this application.

*Table I*

| Aminoazo compound used for condensation with 3.7-dibromo-5-amino-8-hydroxy-1.4-naphthoquinone-1-imine | Color of the solution in ethanol | Color of the solution in conc. sulfuric acid | Color of the sol. in conc. sulfuric acid on addition of p-formaldehyde | Color of dyeing on acetate silk | Color of dyeing on nylon |
|---|---|---|---|---|---|
| 4-aminoazobenzene | pure green | yellow-green | green | pure green | pure green. |
| 4-aminoazotoluene | yellowish green | yellow | brown | yellowish green | green. |
| 4-amino-4'-nitro-azobenzene | do | green | do | yellowish olive | brown. |
| 4-amino-2'-hydroxy-5'-methyl-azobenzene. | pure green | reddish brown | olive | pure green | pure green. |
| 4-amino-4'-ethyl-hydroxyethylamino-azobenzene. | yellowish brown | yellowish brown | do | brown | brownish purple. |
| 4-amino-2-hydroxy-azobenzene | pure green | do | do | green | green. |
| 4'-ethoxy-4-amino-2-hydroxy-azobenzene. | yellowish green | carmine | lilac | do | grey-green. |
| 4-aminobenzene-azo-naphthalene-(1) | bluish green | olive | blue-grey | greenish blue | blue-green. |
| 4-benzene-azo-naphthylamine-(1) | brown-olive | cherry-red | violet | brown-olive | brown. |
| aniline-(4'-azo-4)-(3-methylpyrazolone-(5)). | greenish blue | reddish yellow | blue-green | blue | blue-green. |

*Table II*

| Aminoazo compound used for condensation with 3.7-dibromo-5.8-dihydroxy-1.4-naphthoquinone-1-imine | Color of the solution in ethanol | Color of the solution in conc. sulfuric acid | Color of the solution in conc. sulfuric acid on addition of p-formaldehyde | Color of dyeing on acetate silk | Color of dyeing on nylon |
|---|---|---|---|---|---|
| 4-aminoazobenzene | grey-green | yellow-green | grey-green | grey | grey-brown. |
| 4-amino-4'-nitro azobenzene | brownish green | red-brown | brown | sepia | reddish brown. |
| 4-amino-4'-ethyl-hydroxyethylamino-azobenzene. | reddish brown | reddish brown | yellow-brown | red-brown | Bordeaux. |
| 4-amino-2-hydroxy-azobenzene | yellow-green | brown | red-brown | olive | brown-olive. |
| 4'-ethoxy-4-amino-2-hydroxy-azobenzene. | yellow-olive | purple | lilac | yellow-olive | brown. |
| 4-aminobenzene-azonaphthalene-(1) | blue-grey | lilac | blue-violet | reddish blue | blue-grey. |
| 4-benzene-azonaphthylamine-(1) | brown-olive | cherry-red | red-violet | brown | brown. |

While the dye compounds of the invention have been described more particularly in connection with the coloration of cellulose acetate and nylon textile materials, it is to be noted that they are useful for the coloration of the other materials named herein and that they yield about the same colors on these materials as they do on cellulose acetate and nylon.

These colors may be advantageously directly applied to the material undergoing coloration in the form of an aqueous suspension which can be prepared by milling the dye together with a suitable dispersing agent, such as e. g. the condensation of β-naphthalene-sulfonic acid and formaldehyde, a sulfonated aliphatic alcohol or soap, in presence of common salt, sodium sulfate i. e. to get more efficient milling and by grinding said mixture to a paste in the presence of a sulfonated oil, soap or other suitable dispersing agent and dispersing the resulting paste in water. In some instances, the dye may possess sufficient solubility in water as to render the use of a dispersing agent unnecesssary. Generally speaking, however, the use of a dispersing agent is desirable.

Direct dyeing operations can, with advantage, be conducted at temperatures of about 60–85°, but any suitable temperature may be used. Thus, the textile material to be dyed or colored is ordinarily added to the dye-bath at a temperature lower than that at which the main portion of the dyeing is to be effected, a temperature approximating 45–55°, for example, following which the temperature is raised to that selected for carrying out the dyeing operation. The temperature at which the dyeing is conducted may of course be varied somewhat depending upon the particular material undergoing coloration. As is understood by those skilled in the art, the intensity of dyeing can be varied by varying the proportion of dye to material undergoing coloration. Generally speaking 0.1–4% by weight of dye to material is employed although any desired proportions can be used.

The following example is given to illustrate a method for applying such colors to cellulose acetate fibers:

EXAMPLE 10

40 parts of the insoluble dye of Example 1 are milled together with 40 parts of the sodium salt of a fatty alcohol sulfonate and 20 parts of sodium sulfate. The powder thus obtained is mixed first with the same weight of a highly sulfonated turkey red oil into a fine paste, upon which water of 60° is poured. The whole is stirred until uniform dispersion is obtained, when it is added to the dye-bath through a sieve. The volume of dye-liquor is 1:20 on the weight of the material, the dye-bath being made up with the requisite amount of color and 2 grams of a fatty alcohol sulfonate per liter. The material is entered at 40–50°, the temperature is slowly raised to 80° and dyeing is continued at this temperature for 1 hour. After dyeing the goods are well washed off. One obtains pure green shades fast to light, to gas-fumes and to washing.

The process, as precedingly disclosed, for the dyeing of cellulose acetate, can be used in applying the dyes of the present invention to other cellulose ester fibers, to synthetic polyamide fibers and to polyurethane fibers.

As set forth in the aforesaid application Ser. No. 120,597, the starting compounds wherein Y is NH—for example the starting compound of Example 1, namely, 3.7-dibromo-5-amino-8-hydroxy-1.4-naphthoquinone-1-imine—may be prepared as follows:

10 parts of 1.5-dinitronaphthalene and 2.8 parts of sulfur are added to 200 parts of sulfuric acid monohydrate, whereupon 40 parts of oleum (40% $SO_3$) are allowed to run in at 30°. This results in the formation of the naphthoquinone-imine

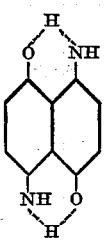

37.6 parts of the latter are then suspended in 500 parts of glacial acetic acid and heated to 65° while stirring thoroughly. After addition of 32.8 parts of anhydrous sodium acetate to the suspension, 64 parts of bromine are introduced dropwise in the course of 45 minutes. Stirring is continued at the same temperature for another half hour. While the naphthoquinone-imine is going into solution, the desired halogenated derivative separates out as a powder and may be isolated by filtration in the cold.

The other corresponding starting compounds may be obtained in analogous manner.

The starting compounds wherein Y is O—for example the starting compound of Example 6, namely, 3.7-dibromo - 5.8 - dihydroxy-1.4-naphthoquinone-1-imine—may be prepared according to the indications of the aforesaid application Ser. No. 34,553, as follows:

90 parts of a paste containing 25 parts of 3.7-dibromo - 5-amino-8-hydroxy - 1.4 - naphthoquinone-1-imine, the other 65 parts being water, are dissolved in 280 parts of sulfuric acid (94%) and the whole heated to 80° C. At this temperature the mass is stirred for 50 minutes, and then the reaction mixture is poured into ice-water, filtered, and washed until free from acid. The product is the desired 3.7-dibromo-5.8 dihydroxy-1.4-naphthoquinone-1-imine.

The other corresponding starting compounds may be obtained in analogous manner.

Having thus disclosed the invention what is claimed is:

1. A process for the manufacture of a condensation product of the naphthoquinone-imine series comprising the step of condensing a halogenated naphthazarine intermediate of the general formula

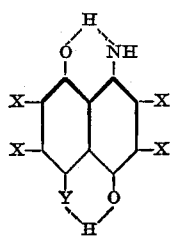

wherein at least one X stands for a member of the group consisting of chlorine and bromine, the other X being hydrogen, and wherein —Y— stands for a member selected from the group consisting of —O— and —NH—, in a solvent with an equimolecular quantity of an aromatic aminoazo compound free from sulfonic acid groups, at a temperature of at least 60°.

2. A process for the manufacture of a condensation product of the naphthoquinone-imine series, comprising the step of condensing a halogenated naphthazarine intermediate of the general formula

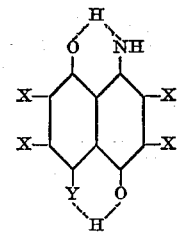

wherein at least one X stands for a member of the group consisting of chlorine and bromine, the other X being hydrogen, and wherein —Y— stands for a member selected from the group consisting of —O— and —NH—, in a solvent with an equimolecular quantity of an aromatic aminoazo compound which corresponds to the formula

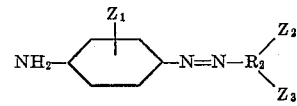

wherein $R_2$ stands for a member selected from the group consisting of phenyl, naphthyl and pyrazolyl radicals, and wherein $Z_1$, $Z_2$ and $Z_3$ stand for members selected from the group consisting of hyrogen, lower alkyl, hydroxy, nitro, lower alkoxy and lower alkyl-lower-hydroxyalkylamino, at a temperature of at least 60°.

3. A process for the manufacture of a new condensation product of the naphthoquinone-imine series, comprising the steps of condensing 3.7-dibromo-5-amino-8-hydroxy-1.4-naphthoquinone-1-imine in a solvent with p-amino-azobenzene at a temperature of at least 60°.

4. A process for the manufacture of a new condensation product of the naphthoquinone-imine series, comprising the step of condensing 3.7-dibromo-5-amino-8-hydroxy-1.4-naphthoquinone-1-imine in a solvent with 4-amino-4'-ethylhydroxyethylamino-azobenzene at a temperature of at least 60°.

5. A process for the manufacture of a new condensation product of the naphthoquinone-imine series, comprising the step of condensing 3.7-dibromo-5.8 - dihydroxy - 1.4 - naphthoquinone-1-imine in a solvent with 4-amino-4'-ethylhydroxyethylamino-azobenzene at a temperature of at least 60°.

6. The condensation products of the naphthoquinone-imine series, corresponding to the general formula

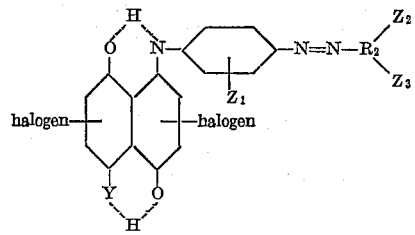

wherein Y stands for a member selected from the group consisting of O and NH, $R_2$ stands for a member selected from the group consisting of phenyl, naphthyl and pyrazolyl radicals, and $Z_1$, $Z_2$ and $Z_3$ represent members selected from the group consisting of hydrogen, lower alkyl, hydroxy, nitro, lower alkoxy and lower alkyl-lower-hydroxyalkylamino.

7. The condensation products of the naphtho-quinone-imine series, corresponding to the general formula

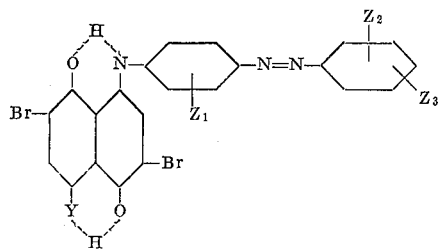

wherein Y stands for a member selected from the group consisting of O and NH, and $Z_1$, $Z_2$ and $Z_3$ stand for members selected from the group consisting of hydrogen, lower alkyl, hydroxy, nitro, lower alkoxy and lower alkyl-lower-hydroxy-alkylamino.

8. The condensation product of the naphtho-quinone-imine series of the formula

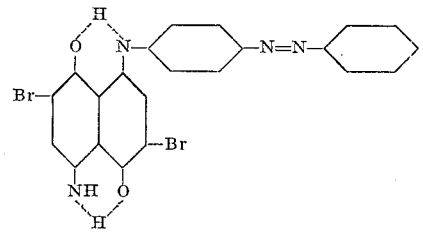

9. The condensation product of the naphtho-quinone-imine series of the formula

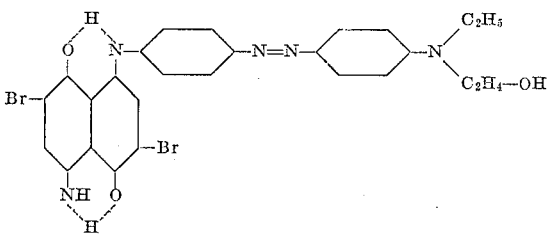

10. The condensation product of the naphtho-quinone-imine series of the formula

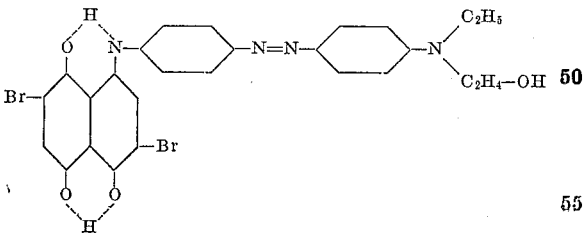

11. The condensation product of the naphtho-quinone-imine series of the formula

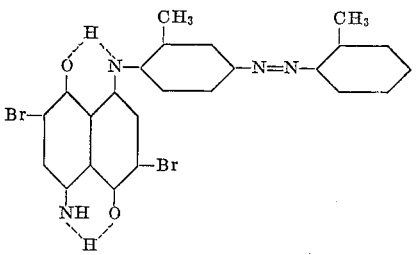

12. The condensation product of the naphtho-quinone-imine series of the formula

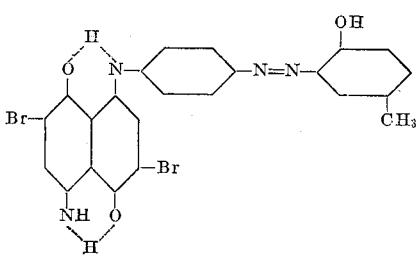

13. A process for the manufacture of a new condensation product of the naphthoquinone-imine series, comprising the step of condensing 3.7-dibromo-5-amino-8-hydroxy-1.4-naphtho-quinone-1-imine in a solvent with 4-amino-azo-toluene at a temperature of at least 60°.

14. A process for the manufacture of a new condensation product of the naphthoquinone-imine series, comprising the step of condensing 3.7-dibromo-5-amino-8-hydroxy-1.4-naphtho-quinone-1-imine in a solvent with 4-amino-2'-hydroxy-5'-methyl-azobenzene at a temperature of at least 60°.

VALENTIN KARTASCHOFF.
ERNEST MERIAN.

No references cited.